US011477166B2

(12) United States Patent
Fink et al.

(10) Patent No.: US 11,477,166 B2
(45) Date of Patent: Oct. 18, 2022

(54) SYSTEMS AND METHODS FOR PROVIDING SECURE EVOLUTION AS A SERVICE

(71) Applicant: Cognizant Technology Solutions U.S. Corporation, College Station, TX (US)

(72) Inventors: Daniel E. Fink, Berkeley, CA (US); Olivier Francon, San Francisco, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 792 days.

(21) Appl. No.: 16/424,686

(22) Filed: May 29, 2019

(65) Prior Publication Data

US 2019/0372935 A1    Dec. 5, 2019

Related U.S. Application Data

(60) Provisional application No. 62/677,571, filed on May 29, 2018.

(51) Int. Cl.
| | | |
|---|---|---|
| *H04L 9/40* | (2022.01) | |
| *G06N 3/12* | (2006.01) | |
| *G06N 3/08* | (2006.01) | |
| *G06N 3/04* | (2006.01) | |
| *G06N 3/02* | (2006.01) | |

(52) U.S. Cl.
CPC .......... *H04L 63/0263* (2013.01); *G06N 3/04* (2013.01); *G06N 3/086* (2013.01); *G06N 3/126* (2013.01); *H04L 63/0236* (2013.01); *H04L 63/0245* (2013.01); *H04L 63/126* (2013.01); *H04L 63/1441* (2013.01); *H04L 63/205* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 8,909,570 B1 | 12/2014 | Hodjat et al. ................... 706/13 |
| 11,003,997 B1 * | 5/2021 | Blackwood .......... G06F 16/951 |
| 2017/0192638 A1 | 7/2017 | Iscoe et al. |
| 2017/0193366 A1 | 7/2017 | Miikkulainen et al. ..................... G06N 3/086 |
| 2017/0193367 A1 | 7/2017 | Miikkulainen et al. |

(Continued)

OTHER PUBLICATIONS

Mahmoudpour et al., Diagnosis of Distributed Denial of Service Attacks using the Combination Method of Fuzzy Neural Network and Evolutionary Algorithm, Indian Journal of Science and Technology, vol. 8(28), DOI: 10.17485/ijst/2015/v8i28/81820, Oct. 2015; pp. 1-7 (Year: 2015).*

(Continued)

*Primary Examiner* — Alan Chen
(74) *Attorney, Agent, or Firm* — Dawn-Marie Bey; Bey & Cotropia PLLC

(57) ABSTRACT

Described herein is a process which facilitates segmented security between domain-specific data sets being evaluated as part of a candidate evaluation service and third-party evolution services, wherein the data sets are not transmitted to the evolution service which is evolving candidates for evaluation. This enables customers with secure data sets to use candidate evolution services securely by obtaining a population of potentially optimal candidate models to evaluate and then optimizing on those data sets in their own secure fashion.

17 Claims, 5 Drawing Sheets

(56) References Cited

U.S. PATENT DOCUMENTS

2017/0193403 A1 7/2017 Iscoe et al. .......... G06N 99/005
2018/0018590 A1* 1/2018 Szeto .................... G06N 20/10

OTHER PUBLICATIONS

Alesawy et al., Elliptic Curve Diffie-Hellman Random Keys Using Artificial Neural Network and Genetic Algorithm for Secure Data over Private Cloud, Inform. Technol. J., 15 (3): 77-83, 2016 (thru ResearchGate); Total pp. 9 (Year: 2016).*
Oreski et al., Hybrid system with genetic algorithm and artificial neural networks and its application to retail credit risk assessment, Expert Systems with Applications 39 (2012); pp. 12605-12617 (Year: 2012).*
Golovin, et al., "Google Vizier: A Service for Black-Box Optimization," Proceedings of the $23^{rd}$ ACM SIGKDD International Conference on Knowledge Discovery and Data Mining, pp. 1487-1495, 2017.
Liang, et al., "Evolutionary Architecture Search for Deep Multitask Networks," arXiv: 1803.03745, 2018.
Meyerson, et al., "Pseudo-Task Augmentation: From Deep Multitask Learning to Intratask Sharing and Back," arXiv: 1803.04062, 2018.
Rawal, et al., "From Nodes to Networks: Evolving Recurrent Neural Networks," arXiv: 1803.04439, 2018.
Zhang, et al., "Evolutionary Computation Meets Machine Learning: A Survey," IEEE Computational Intelligence Magazine, vol. 6, No. 4, DOI 10.1109/MCI.2011.942584, 2011.
Bergstra, et al., (2013), "Hyperopt: A Python Library for Optimizing the Hyperparameters of Machine Learning Algorithms," Proceedings of the $12^{th}$ Python in Science Conference (SCIPY 2013).

* cited by examiner

```
{
    "version": "2017-06-27",
    "treatmentId": "default",
    "traits": {
        "category1": {
            "id": 13,
            "experimentId": 34,
            "candidateId": 9,
            "generationId": 4,
            "genes": {
                "algorithm": "BAYES",
                "seedLambda": 0.5,
                "seedShrinkage": 0.5,
                "multiSeedLambda": 0.5,
                "brandKernelWeight": 2,
                "colorKernelWeight": 2,
                "entropyNumSamples": 500,
                "brandSeedShrinkage": 0.5,
                "colorSeedShrinkage": 0.5,
                "multiSeedShrinkage": 0.5,
                "productShrinkFactor": 0.5,
                "entropyNumIterations": 50,
                "hideDisplayedProducts": true
            }
        }
    },
    "environment": {
        "client": "internal",
        "name": "aware2",
        "categories": {
            "category1": {
                "apiUrl": "https://example-api-endpoint/v1"
            }
        },
        "reportingUrl": "https://reporting-api-endpoint/v1"
        "currentCategory": "category1"
    },
    "features": {
           "hideCTA": true
    },
    "scriptUrls": [
        "https://static.sentientawareapi.com/2.0.1/dlls/polyfills.dll.js",
        "https://static.sentientawareapi.com/2.0.1/dlls/vendor.dll.js",
        "https://static.sentientawareapi.com/2.0.1/dlls/sdk.dll.js",
        "https://static.sentientawareapi.com/customizations/3.0.0/dlls/default/customizations.dll.js",
        "https://static.sentientawareapi.com/2.0.1/browser/sentient-bootstrapped.min.js"
    ]
}
```

310 — "features"

216 — "scriptUrls"

FIG. 4

SYSTEMS AND METHODS FOR PROVIDING SECURE EVOLUTION AS A SERVICE

CROSS REFERENCE TO RELATED APPLICATIONS

This application claims the benefit of U.S. Provisional Application No. 62/677,571, filed May 29, 2018, and titled "Systems and Methods For Providing Secure Evolution as a Service," which is incorporated herein by reference in its entirety.

FIELD OF EMBODIMENTS

The embodiments described herein are directed to securing domain specific data sets and code from entities using the data sets in Evolution-as-a-Service ("EaaS") processes.

BACKGROUND OF THE EMBODIMENTS

To this day, the phrase artificial intelligence ("AI") conjures up in the minds of most an intelligent machine, such as a self-driving car or a computer that is able to beat an expert chess player at a game of chess. But in the last 20 years, with the increased availability of computing resources, types of AI have been applied in attempts to solve specific problems in many fields that rely on data mining and data processing. Falling generally under the penumbra of the AI, are numerous sub fields, approaches, and techniques which are related in that they usually involve a non-human agent which is able to mimic one or more cognitive functions associated with human intelligence. And AI is being extended to include other machine-implemented aspects of human intelligence, e.g., emotional and social intelligence, as applied to particular goals and problems.

Again, while AI might be most frequently associated with intelligent automation machines, e.g., robots or cars, which perform human actions, this is only the tip of the iceberg. With on-going developments in AI-related fields of machine learning, deep learning and evolutionary computing, AI techniques can be applied in every industry to address health, legal and business-related goals and problems. Essentially, at every current intersection between technology and a goal or problem, there is a potential AI solution. As professionals and companies operating in different industries recognize the benefits of utilizing AI-based solutions, various third-party AI vendors will emerge to provide the support for these solutions. And just like current technology offerings such as cloud computing and storage services including software-as-a-service (SaaS) offerings, which may be hosted and managed by a third-party service provider or vendor, face various privacy and security issues, so too will AI-based product offerings.

By way of particular example, consider the generalized case where a third-party vendor offers Evolution-as-a-Service ("EaaS"), whereby the third-party vendor uses evolutionary computing to generate candidate code or models which are then made accessible to customers for optimization in the customer specific domain using customer specific data sets. There is a need in the art for securing and protecting the third-party vendor technology, i.e., evolutionary computing processes and implementation algorithms, from access by customers. Likewise, the customer data sets, which might include competitive business-related data and/or health-related data and the like, which needs to be protected from access by the third-party vendor. As such a need exists in the art for maintaining data and process privacy and security in an AI process involving one or more independent parties, e.g., customer and vendor.

SUMMARY OF THE EMBODIMENTS

The technology disclosed securely separates the domain specific data sets being evaluated in a candidate evaluation system from an evolution service. A firewall between the data sets and the evolution service allows customers who own their data sets to use evolution securely while obtaining a population of potentially optimal candidate models to evaluate individuals in a secure manner.

The technology disclosed also allows providers of evolution services to provide services without giving access to customers to their evolution algorithms, code, and data. Thus protecting their valuable intellectual property. The technology disclosed is applicable to a wide variety of representations of genetic material ranging from individuals (genomes) representing e-commerce website parameters to candidate neural networks.

In a first exemplary embodiment, a process for evolving candidate individuals for optimization against a secure third-party data set includes: receiving at a first server of a receiving party a first secure request for evolution of a first population of candidate individuals in accordance with a set of domain factors established by a requesting party; creating by the receiving party a first population of candidate individuals and assigning a unique candidate identifier to each of the candidate individuals in the first population; and transmitting a first secure response, including the first population of candidate individuals with assigned candidate identifiers, to a second server of the requesting party, wherein the first server and the second server are separate by a firewall.

In a second exemplary embodiment, a process for evolving candidate individuals for optimization against a secure data set includes: transmitting a first secure request from a first server for evolution of a first population of candidate individuals in accordance with a set of domain factors to a second server; receiving a first secure response, including the first population of candidate individuals with assigned candidate identifiers, at the first server, wherein the first server and the second server are separate by a firewall; and evaluating one or more of the candidates individuals against the secure data set to determine measurements indicative of a fitness of each of the candidate individuals for a predetermined use.

BRIEF DESCRIPTION OF THE FIGURES

The invention will be described with respect to specific embodiments thereof, and reference will be made to the drawings, in which:

FIG. 4 illustrates an exemplary second candidate format in accordance with one or more embodiments herein.

DETAILED DESCRIPTION

The embodiments disclosed allow for segmented security between domain-specific data sets being evaluated as part of a candidate evaluation service, wherein the data sets are not transmitted to the evolution service which is evolving candidates for evaluation. This enables customers with secure data sets to use candidate evolution services securely by obtaining a population of potentially optimal candidate models to evaluate and then optimizing on those data sets in their own secure fashion.

The embodiments herein also allows data and code details of the Evolution Service implementation to remain secure from entities using the service, thus protecting data and intellectual property of the service provider.

Evolution as a Service (EaaS)

Figure 1:
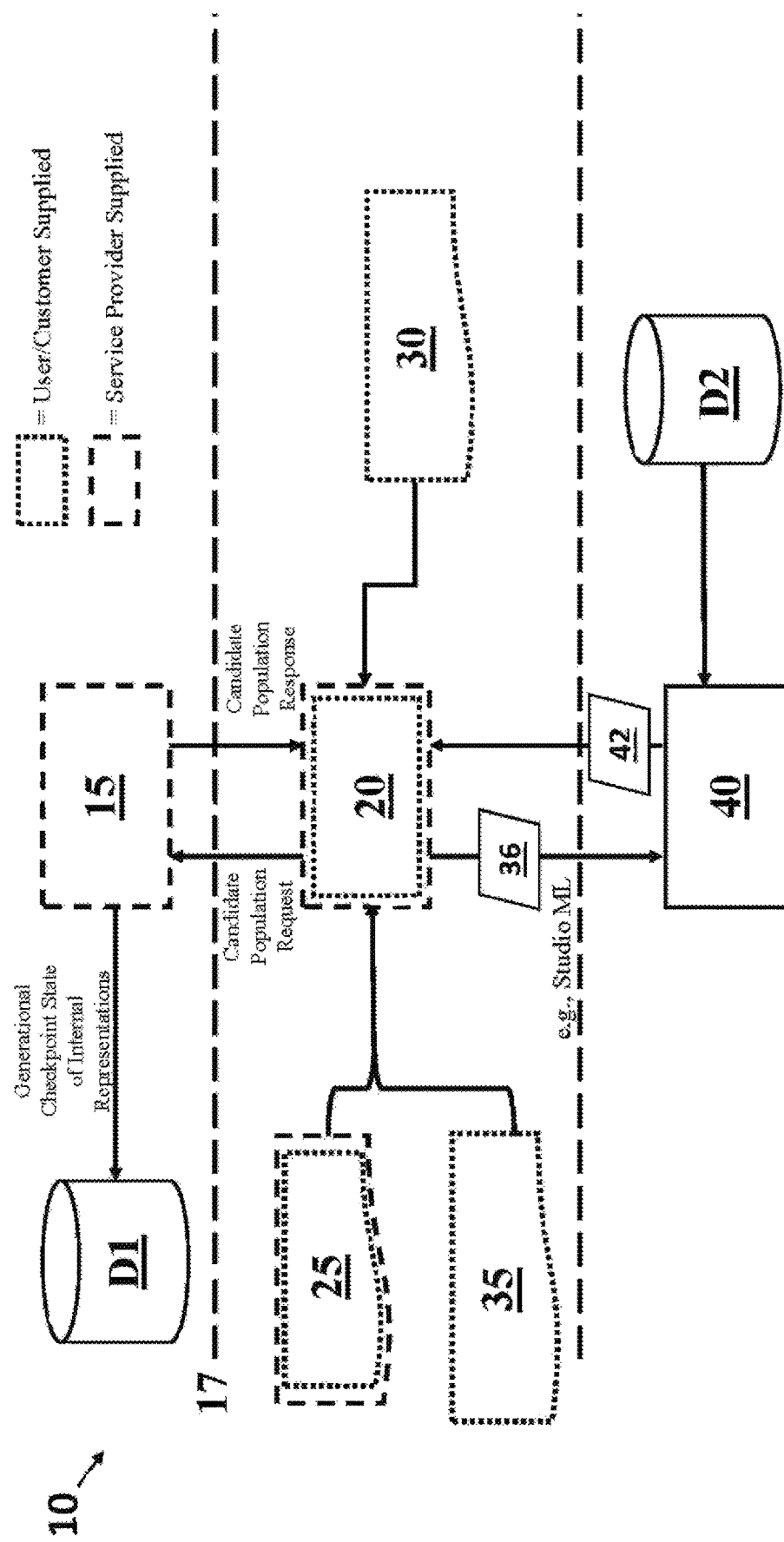
FIG. 1 is a high level diagram of an EaaS embodiment described herein.

EaaS includes two primary components or subsystems/processes: an Evolution Service and a Candidate Evaluation System. FIG. 1 illustrates an exemplary schematic of EaaS 10 components/processes including representative inputs and data flows. The Evolution Service 15 communicates with the Candidate Evaluation System 20 (also called Experiment Host) across a firewall 17. Inputs to the Candidate Evaluation System 20 may include experiment framework code (e.g., Python) 25, experiment configuration (e.g., JSON/YAML) 30 and domain-specific evaluation code 35 (e.g., evaluate_candidate( )). As indicated in FIG. 1, the Candidate Evaluation System 20 may be hosted by a third-party, e.g., the EaaS service provider, or the customer. In an embodiment, the subsystems 15 and 20 run on physically distinct hosts, each within their own secure environment separated by the firewall 17. The firewall 17 is symbolic since it is created by software aspects of the embodiments described herein. Additionally, conventional hardware firewalls may be present as well as will be appreciated by one skilled in the art.

The EaaS sub systems 15 and 20 communicate with each other via encrypted connection using standard network traffic. There can be one or more intermediary devices such as a content delivery network (CON) positioned between the Evolution Service 15 and the Candidate Evaluation System 20. In one embodiment, the CON is positioned on the same side of the firewall 17 as the Candidate Evaluation System 20. In another embodiment, the Candidate Evaluation System 20 is positioned on the same side as the Evolution Service 15. In yet another embodiment, parts of the CON are positioned on both sides of the firewall 17.

Further to FIG. 1, customers may use candidate model management framework services such as those supported by Studio.ml, in order to manage, track, reproduce, and share the candidate experiments. Studio.ml uses publicly available cloud computing resources, e.g, Amazon EC2, Google Cloud Computer, Microsoft Azure to implement Studio.ml evaluation worker instances 40. Input 36 to the Studio.ml worker instances 40 includes, e.g., an evaluation worker request with single candidate, evaluation configuration, evaluation code and Python dependencies. Output 42 from the Studio.ml worker instances 40 includes single candidate with metrics.

Evolution Service

The Evolution Service 15 is responsible for:

a) Accepting configuration information regarding the constraints of Evolution from the Candidate Evaluation System 20.

b) Creating new populations of candidates of possible optimizations from no prior candidates.

c) Creating new populations of candidates from previous populations of priors, based on fitness data for each prior candidate.

d) Securely reading/writing checkpoints of hidden representation representing evolution state, so that such state can be resumed at any point in the future, only by the Evolution Service 15. Such state can be associated with an insecure key which is shared with the Candidate Evaluation System 20.

e) Providing translations/interpretations of any new candidates generated by the Evolution Service 15 in a representation such that the Candidate Evaluation System 20 knows what to do with the candidates once it gets them.

f) Assignment of unique identifiers for each of the candidates ("candidate ID").

Candidate Evaluation System

The Candidate Evaluation System 20 is responsible for:

a) Initiating requests from the Evolution Service 15 (with or without results from prior candidates, configuration updates, insecure checkpoint keys, etc.)

b) Evaluating candidates against the secure data set (by a mechanism of its own choosing) such that enough measurements about the candidates can be taken to inform the creation of the next population.

In the example below the Candidate Evaluation System 20 and the Evolution Service 15 are intended to be running on two distinct hosts, each within their own secure environments. Communication is limited to standard network traffic between the two, over a (potentially encrypted) socket connection. Preferably, the two hosts are physically distinct, but in an alternative embodiment they may be different virtual machines sharing a common physical computer platform.

First, the customer uses the Candidate Evaluation System 20 to initiate contact with Evolution Service 15 by communicating configuration information regarding constraints of the search space for genetic material, variations and/or known parameters on algorithm, and selection of the representation by which the Candidate Evaluation System wishes to receive candidates, etc. The Evolution Service 15 accepts configuration and creates a new candidate population either originally or based on prior candidates (if any) and new algorithm configuration (if any). Each member candidate of the candidate population is assigned a specific candidate identifier ("candidate ID"), unique (at least) amongst other candidates in the present experiment. Internal representation of the population is put through a selected translator which translates each instance of candidate genetic material for each candidate in the population into a candidate representation known to the Candidate Evaluation System 20, each associated with its original candidate ID. A checkpoint key, unique to the present experiment and population, along with the translated candidate representations and their associated candidate IDs are communicated back to the Candidate Evaluation System 20.

The Candidate Evaluation System 20 receives checkpoint key and corresponding population and evaluates each candidate of the population against its secure data set, in whatever secure environment is required (if any). For each candidate evaluation, the Candidate Evaluation System 20 records measurements of performance against the secure data set. The secure data set may be static or dynamic, such as where candidates are tested online against actual users. When all evaluation is complete (as determined by the domain-specific aspects of the Candidate Evaluation System 20), evaluation results each associated with their candidate ID's are potentially reported back to the Evolution Service 15 with the previous checkpoint key. The Evolution Service 15 repeats the process starting with creating a new candidate population as describe above, unless some experiment-specific termination criteria is reached.

Figure 2:
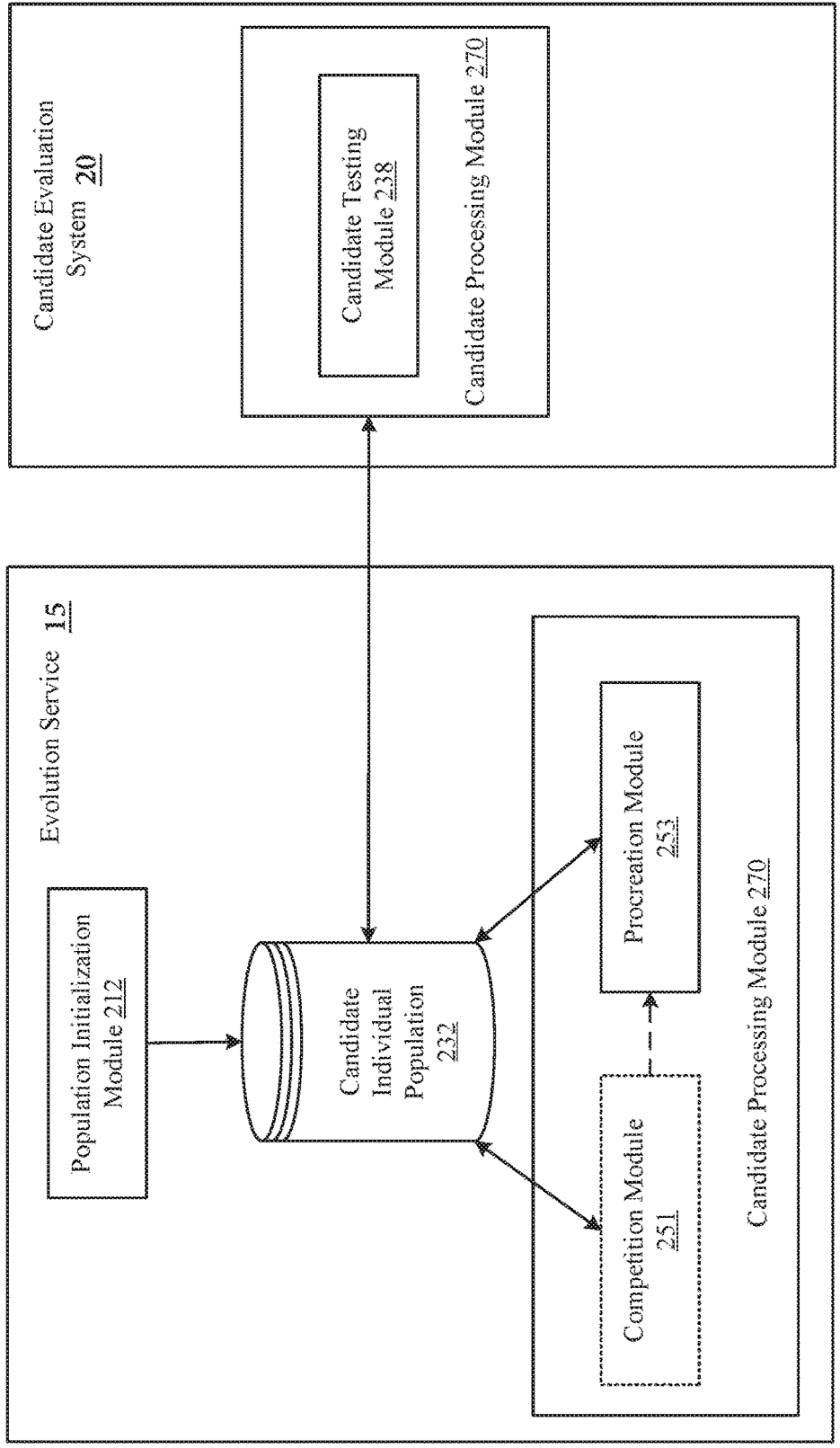
FIG. 2 illustrates an exemplary modules configuration which can be used to implement evolution services in accordance with one or more embodiments herein.

FIG. 2 illustrates representative modules that can be used to implement the Evolution Service 15 and Candidate Evaluation System 20. In FIG. 2, dotted lines indicate optional modules. The modules in FIG. 2 can be implemented in hardware or software, and need not be divided up in precisely the same blocks as shown in FIG. 2. Some of the modules can also be implemented on different processors or computers, or spread among a number of different processors or computers. In addition, it will be appreciated that some of the modules can be combined, operated in parallel or in a different sequence than that shown in FIG. 2 without affecting the functions achieved. Also as used herein, the term "module" can include "sub-modules", which themselves can be considered herein to constitute modules. In particular, candidate testing module 238, competition module 251, and procreation module 253 are also considered herein to be sub-modules of a candidate processing module 270. Note that candidate testing module 238 is part of Candidate Evaluation System 20 running on a separate host from the Evolution Service 15 as described above. The blocks in FIG. 2, designated as modules, can also be thought of as flowchart steps in a method. A module also need not necessarily have all its code disposed contiguously in memory; some parts of the code can be separated from other parts of the code with code from other modules or other functions disposed in between.

Referring to FIG. 2, at the Evolution Service 15 after accepting configuration information regarding the constraints of Evolution from the Candidate Evaluation System 20, the candidate individual population 232 is initialized by a population initialization module 202, which writes a preliminary pool of candidate individuals in the population 102. The preliminary pool can be created randomly, or in some embodiments, a priori knowledge can be used to seed the first generation. In another embodiment, candidate individuals from prior runs can be borrowed to seed a new run. At the start, all candidate individuals are initialized with performance measures 106 that are indicated as undefined. The population initialization module 202 also defines a candidate search space. As used herein, the term "candidate search space" refers to a space having M dimensions, where each dimension represents an axis along which different candidate individuals can have different values. The size of the space in each dimension is equal to the range of values available for that dimension. In one implementation, the operation of each of the modules shown in FIG. 2 is described in the U.S. Nonprovisional application Ser. No. 15/399,450 published as U.S. Patent Publication No. 20170192638 incorporated by reference herein.

Let us consider application of the EaaS to an e-commerce example. In e-commerce, designing user experiences, i.e., webpages and interactions, which convert as many users as possible from casual browsers to paying customers is an important goal. While there are some well-known design principles, including simplicity and consistency, there are also often unexpected interactions between elements of the webpage that determine how well it converts. The same element may work well in one context but not in others. It is often difficult to predict the result, and even more difficult to decide how to improve a given webpage. A website host running a Candidate Evaluation System 20 may employ a website modification Evolution Service 15 as described herein to provide a presentation of its webpages that maximizes conversion.

Figure 3:
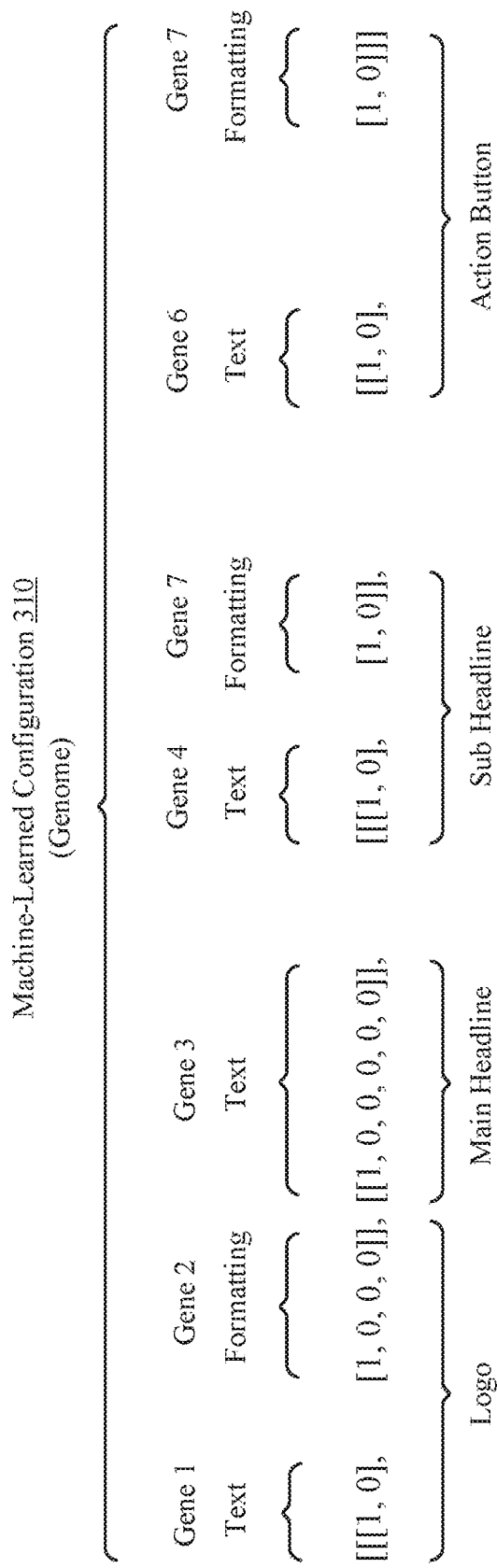
FIG. 3 illustrates an exemplary first candidate format in accordance with one or more embodiments herein.

In a first embodiment, each candidate individual in the population generated by the Evolution Service 15 is in a "coded" genome form as shown in FIG. 3. For example, if the purpose is to evolve better web funnels, the coded genome form may be like FIG. 3 and the useful form can be as shown in FIG. 4. As described herein, the Evolution Service 15 and the Candidate Evaluation System 20 are separated from each other by the firewall 17. The Evolution Service 15 transmits the candidate individual 310 in an encrypted form as shown in FIG. 3 through the firewall 17 to the Candidate Evaluation System 20. The Candidate Evaluation System 20 then converts the candidate from the coded genome form (FIG. 3) to the useful form prior to experimentation and evaluation with secure data.

By way of particular example, continuing with the example of webpage evaluation, consider a webpage has four elements: logo, main headline, sub headline, and action button. Each element has corresponding dimensions. For example, logo has two dimensions: logo text and logo formatting. Dimensions have corresponding rendering values for example, logo text has two rendering values: control value and value 1. As shown in FIG. 3, an individual encodes the rendering values in a binary sequence called a genome, which is further compartmentalized into subsequences called genes.

FIG. 3 illustrates that each individual can represent a dimension of an element of a webpage and encode rendering values corresponding to the dimension. For each gene, only one of the bits can be active or hot (e.g., represented by 1) so as to identify a particular rendering value from a set of available rendering values. The leftmost bit can represent the control value of an individual, which, in one example, for main headline might indicate plain text. The second, third, and forth bits might, for example, indicate bold text, italics text, and bold underlined text, respectively. It will be appreciated that many other encodings are possible. For example, a two-bit numeric value might be used, with 0 indicating plain text, 1 indicating bold text, 2 indicating italics text, and 3 indicating bold underlined text.

In a second embodiment, the candidate individual is sent through the firewall in a "useful" form as shown in FIG. 4. Prior to transmission, the Evolution Service 15 converts the candidate individual from coded genome form (e.g., FIG. 3) to a form useful for its purposes as identified in the initial request to the Evolution Service 15 from the Candidate Evaluation System 20. As described above in the first embodiment, the individual is transmitted through the firewall 134 in an encrypted form. This is one example of the individual of FIG. 3 in a usable JavaScript Object Notation (JSON) format 300. In JSON code 300, the additional scripts 216 are identified as "scriptUrls", which further contains links to five scripts. These scripts, when executed by the client/customer, generate the updated interface version of the portion of the webpage, as discussed above.

Figure 5:
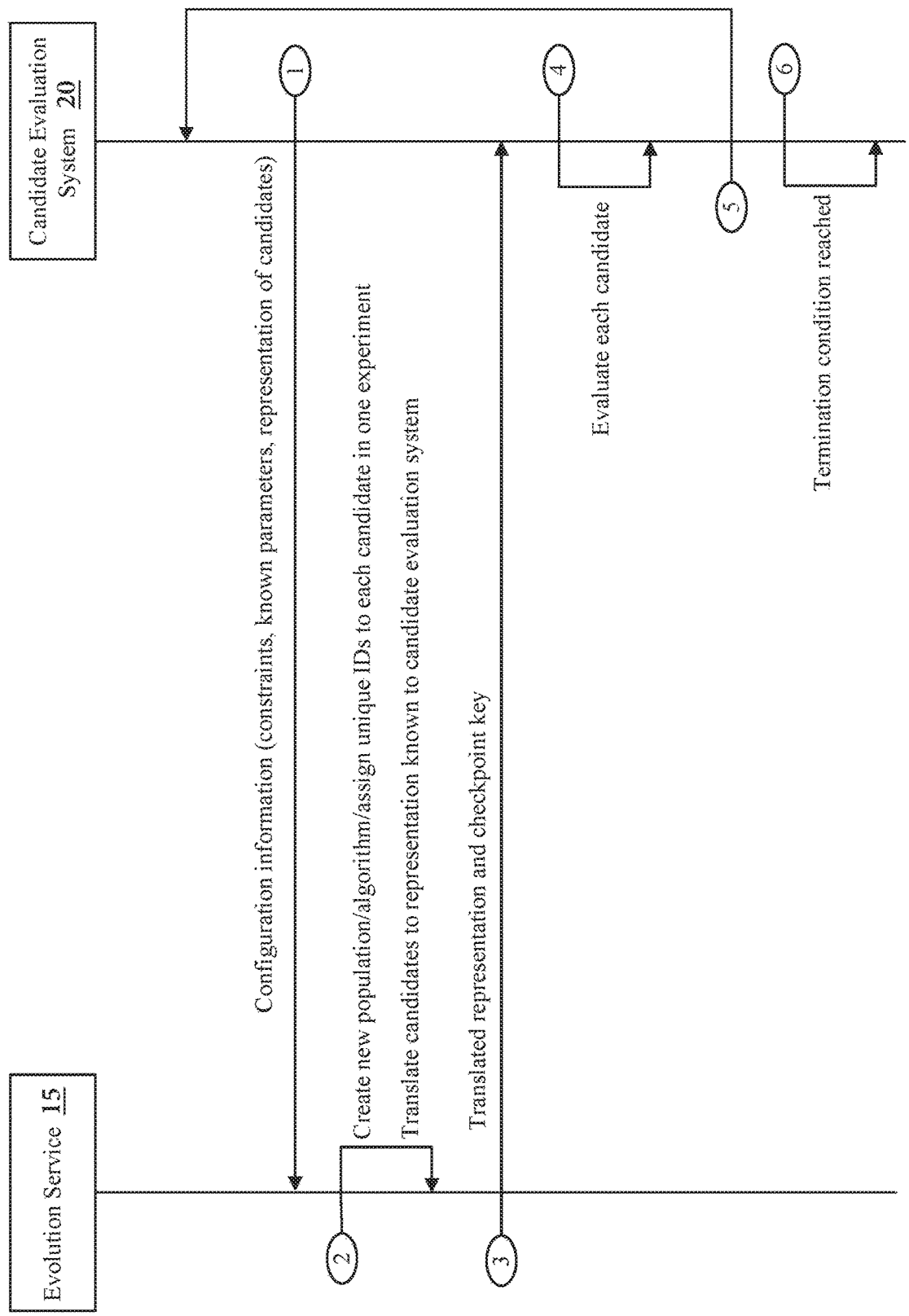
FIG. 5 illustrates and exemplary messaging flow in accordance with one or more embodiments herein.

FIG. 5 is a message sequence diagram illustrating the communication between the Evolution Service 15 and Candidate Evaluation System 20. As indicated above, the two systems 15 and 20 are separated by a firewall 17 (not shown in FIG. 5) and all communication between the two systems is encrypted. The Candidate Evaluation System 20 establishes communications with the Evolution Service 15 in a message 1 (M1) by sending configuration information including, e.g., constraints, known parameters and usable representation of evolved candidates, to the Evolution Service 15. The Evolution Service 15 creates new population of individuals and new algorithm configurations. The Evolution Service 15 assigns unique candidate identifiers (candidate IDs) to each candidate individual in the created population. The candidate IDs are unique at least amongst individuals in the same experiment (message M2). In one embodiment, the Evolution Service 15 uses a translator to translated each instance of candidate genetic material in a first format into a second format representation known to the Candidate Evaluation System 20. Alternatively, as discussed above, this translation may be completed back at the Candidate Evaluation System 20.

The translated representations of the candidates in the second format, along with a checkpoint key, are sent to the Candidate Evaluation System 20 via a message M3. The Candidate Evaluation System 20, evaluates each individual against its data set in a secure environment (message M4). The above process is repeated via a message M5 until an experiment specific criteria is reached (message M6).

The technology disclosed can use any specific representation of evolved material and keep the secure data and implementation properties as described above. In one such implementation, the technology disclosed is used to generate candidate Neural Networks via evolution.

In one example implementation, a similar service can be used to evolve anything from website GUI's, to motions of robots, shapes and properties of objects intended to be made physical at some later date.

Aspects of the invention can also apply to other population-based algorithms and population-based machine learning algorithms beyond evolution as well.

Beyond the description of the technology disclosed above, also incorporated are the following patent applications which are considered part of this disclosure. The examples presented in the following incorporated applications and research publications exemplify situations in which aspects of the invention can be used. These following documents are incorporated by reference herein in their entireties: U.S. Nonprovisional application Ser. No. 15/399,450 filed on Jan. 5, 2017, titled "Machine Learning Based Webinterface Production and Deployment System;" U.S. Nonprovisional application Ser. No. 15/399,523 filed on Jan. 5, 2017, titled "Webinterface Production and Deployment Using Artificial Neural Networks;" Golovin, et. al., (2017), "Google Vizier: A Service for Black-Box Optimization," Proceedings of the 23rd ACM SIGKDD International Conference on Knowledge Discovery and Data Mining, pp. 1487-1495; Liang, et. al., (2018), "Evolutionary Architecture Search for Deep Multitask Networks," arXiv: 1803.03745; Meyerson, et. al., (2018), "Pseudo-task Augmentation: From Deep Multitask Learning to Intrastask Sharing and Back," arXiv: 1803.04062; Rawal, et. al., (2018), "From Nodes to Networks: Evolving Recurrent Neural Networks," arXiv: 1803.04439; Zhang, et al., (2011), "Evolutionary Computation Meets Machine Learning: A Survey," IEEE Computational Intelligence Magazine, Vol. 6, No. 4, DOI 10.1109/MCI.2011.942584.

The invention claimed is:

1. A process for evolving candidate individuals for optimization against a secure third-party data set comprising:
receiving at a first server of a receiving party a first secure request for evolution of a first population of candidate individuals in accordance with a set of domain factors established by a requesting party, wherein the set of domain factors includes one or more of: domain constraints, known domain parameters and formatting rules for a specific representation of each of the candidate individuals and the first secure request includes a first checkpoint key;
creating by the receiving party a first population of candidate individuals and assigning a unique candidate identifier to each of the candidate individuals in the first population;
transmitting a first secure response, including the first population of candidate individuals with assigned candidate identifiers, to a second server of the requesting party, wherein the first server and the second server are separate by a firewall;
receiving at the first server, a second secure request for evolution of a second population of candidate individuals, where the second secure request includes the first checkpoint key and results of evaluation by the second server of one or more of the candidate individuals from the first population against the secure third-party data set;
creating by the receiving party the second population of candidate individuals and assigning a unique candidate identifier to each of the candidate individuals in the second population; and
transmitting a second secure response, including the second population of candidate individuals with assigned candidate identifiers, to the second server of the requesting party, wherein the second secure response includes a second checkpoint key.

2. The process according to claim 1, further comprising: translating by a translator of the receiving party each of the candidate individuals from a first format to a second format in accordance with the formatting rules.

3. The process according to claim 2, wherein the first format is a coded genome format.

4. The process according to claim 2, wherein the second format is in JSON code.

5. The process according to claim 1, further comprising: translating by the translator of the receiving party each of the second candidate individuals from a first format to a second format in accordance with the formatting rules.

6. The process according to claim 5, wherein the first format is a coded genome format.

7. The process according to claim 5, wherein the second format is in JSON code.

8. The process according to claim 1, wherein the candidate individuals are neural networks.

9. The process according to claim 1, wherein the first secure request and the first secure response are encrypted.

10. A process for evolving candidate individuals for optimization against a secure data set comprising:
transmitting a first secure request from a first server for evolution of a first population of candidate individuals in accordance with a set of domain factors to a second server, wherein the first secure response further includes a first checkpoint key;
receiving a first secure response, including the first population of candidate individuals with assigned candidate identifiers, at the first server, wherein the first server and the second server are separate by a firewall;
evaluating one or more of the candidates individuals against the secure data set to determine measurements indicative of a fitness of each of the candidate individuals for a predetermined use;
transmitting by the first server, a second secure request for evolution of a second population of candidate individuals, where the second secure request includes the first checkpoint key and results of the evaluation by the first server of the one or more candidate individuals from the first population against the secure data set; and
receiving a second secure response, including the second population of candidate individuals with assigned candidate identifiers, at the first server, wherein the second secure response includes a second checkpoint key.

11. The process according to claim 10, further comprising:
 translating by a translator of the first server each of the first candidate individuals from a first format to a second format in accordance with the formatting rules.

12. The process according to claim 11, wherein the first format is a coded genome format.

13. The process according to claim 11, wherein the second format is in JSON code.

14. The process according to claim 10, further comprising:
 translating by the translator of the first server each of the second candidate individuals from a first format to a second format in accordance with the formatting rules.

15. The process according to claim 14, wherein the first format is a coded genome format.

16. The process according to claim 14, wherein the second format is in JSON code.

17. The process according to claim 10, wherein the first secure request and the second secure request are encrypted.

* * * * *